(12) United States Patent
Ueshima et al.

(10) Patent No.: US 6,279,456 B1
(45) Date of Patent: Aug. 28, 2001

(54) PISTON

(75) Inventors: Hideo Ueshima; Yukihiro Noguchi, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/506,938

(22) Filed: Feb. 18, 2000

(30) Foreign Application Priority Data

Feb. 22, 1999 (JP) .................................................... 11-42686

(51) Int. Cl.[7] .......................................................... F02F 3/00
(52) U.S. Cl. ................................................... 92/187; 92/153
(58) Field of Search ............................ 92/128, 153, 157, 92/187, 238

(56) References Cited

U.S. PATENT DOCUMENTS

| 4,013,057 | * | 3/1977 | Guenther ............................ 92/187 X |
| 4,683,808 | * | 8/1987 | Wacker et al. .................... 92/238 X |
| 5,746,169 | * | 5/1998 | Issler et al. ....................... 92/187 X |

FOREIGN PATENT DOCUMENTS 3-42046    4/1991   (JP) .

* cited by examiner

*Primary Examiner*—John E. Ryznic
(74) *Attorney, Agent, or Firm*—Armstrong, Westeman, Hattori, McLeland & Naughton, LLP

(57) ABSTRACT

A recessed portion 15 for removing a circlip 13 is formed in such a manner as to coincide in location with a broached groove 12 formed in a piston bore 2a for relieving the compression deformation of a piston pin 10 that would be caused by a thrust load.

16 Claims, 4 Drawing Sheets

PISTON

BACKGROUND OF THE INVENTION

1. Field of the Invention

The present invention relates to a structure of a pin bore of a piston for use in an engine.

2. Description of the Related Art

Conventionally, a piston pin for connecting a connecting rod is assembled to a piston used in an engine, and axial ends of the piston pin are supported to pin bores formed coaxially with each other in a pair of piston pin supporting portions of the piston.

In a piston as described above, as described in Japanese Utility Model Unexamined Publication No. Hei.3-42046, a lubricating oil holding portion is provided by forming an axial groove in an inner circumferential surface of a pin bore (for a piston pin) along an axial direction thereof. In addition, a piston pin is normally prevented from being removed by mounting a snap ring which is an annular ring in a snap ring groove formed in an inner circumferential surface of a pin bore. In servicing a vehicle for maintenance, there is a need for the piston pin to be removed, and in order to facilitate the removal thereof, there is formed a snap ring groove relief as a recessed portion for a relevant tool to be inserted thereinto for removing the snap ring.

However, the recessed portion is formed deeper than the axial groove from a need for the tool to be inserted thereinto. This causes a problem that the rigidity of the piston pin supporting portion is deteriorated at the recessed portion.

SUMMARY OF THE INVENTION

With a view to solving the problem, it is an object of the invention to realize the prevention of deterioration in rigidity at the piston pin supporting portion even when the recessed portion is formed for facilitating the removal of the annular clip for preventing the removal of the piston pin.

To attain the above object, there is provided a piston pin bore structure in which a circumferential groove (14) is formed in an inner circumferential surface of a pin bore (2a) for assembling therein an annular clip (13) for preventing the removal of a piston pin (10) inserted through the piston bore (2a). A recessed portion (15) formed in the inner circumferential surface of the pin bore (2a) at an outer end thereof so that the annular clip (13) can be removed by deforming the annular clip in a radially inward direction coincides in location with an axial groove (12) formed in the inner circumferential surface of the pin bore (2a).

According to the above construction, the deterioration in rigidity that would be caused by the provision of the recessed portion can be prevented by forming the recessed portion by making use of a position where the axial groove is formed in such a manner that the recessed portion coincides in location with the axial groove. Moreover, the lubrication inside the pin bore can be improved preferably since a lubricating oil can be led into the axial groove via the recessed portion.

DETAILED DESCRIPTION OF THE PREFERRED EMBODIMENTS

A mode of carrying out the invention will be described in detail below referring to the accompanying drawings showing an embodiment of the invention.

Figure 1:
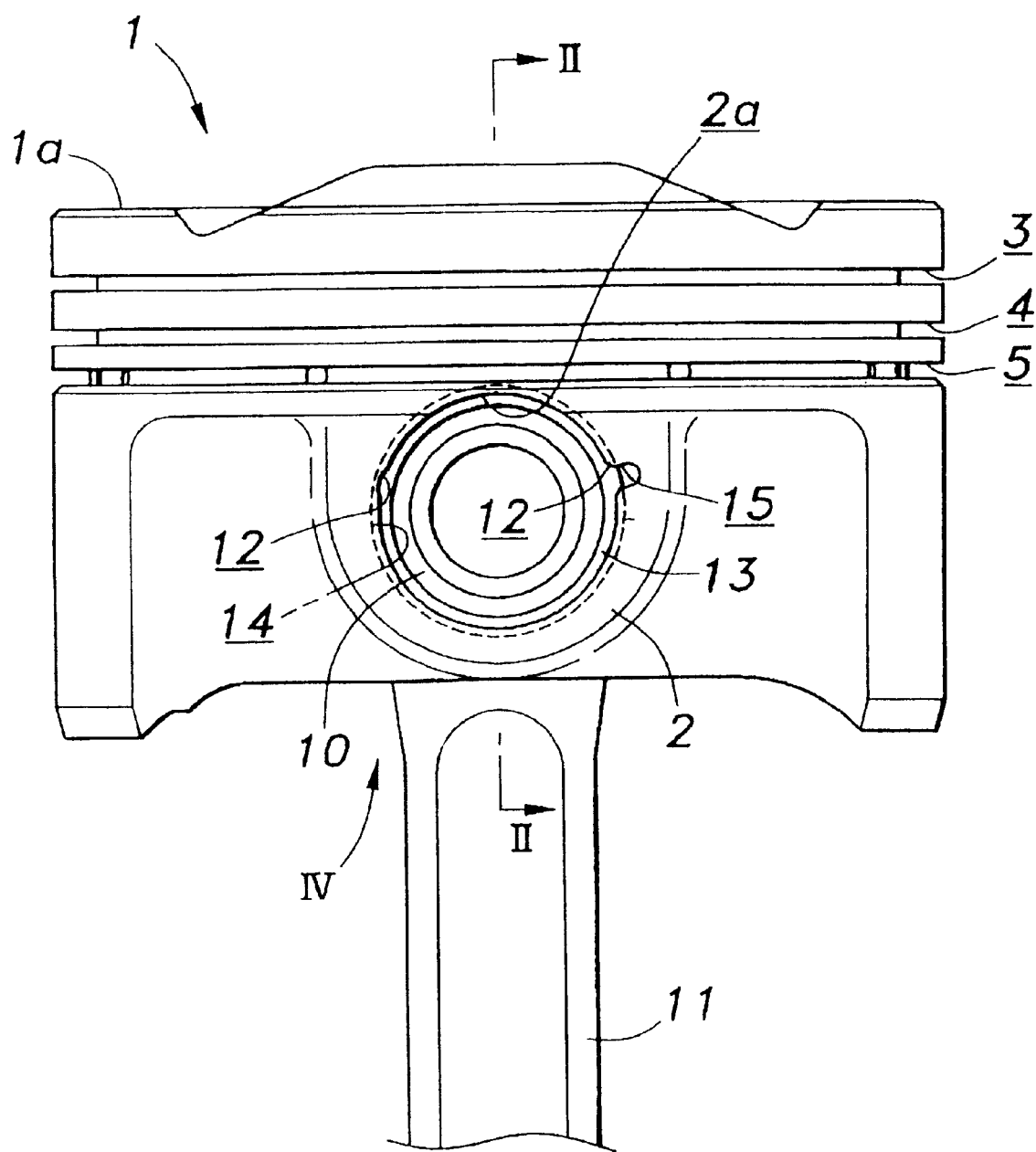
FIG. 1 is a front view showing a piston 1 for use in an engine to which the present invention is applied.
Figure 2:
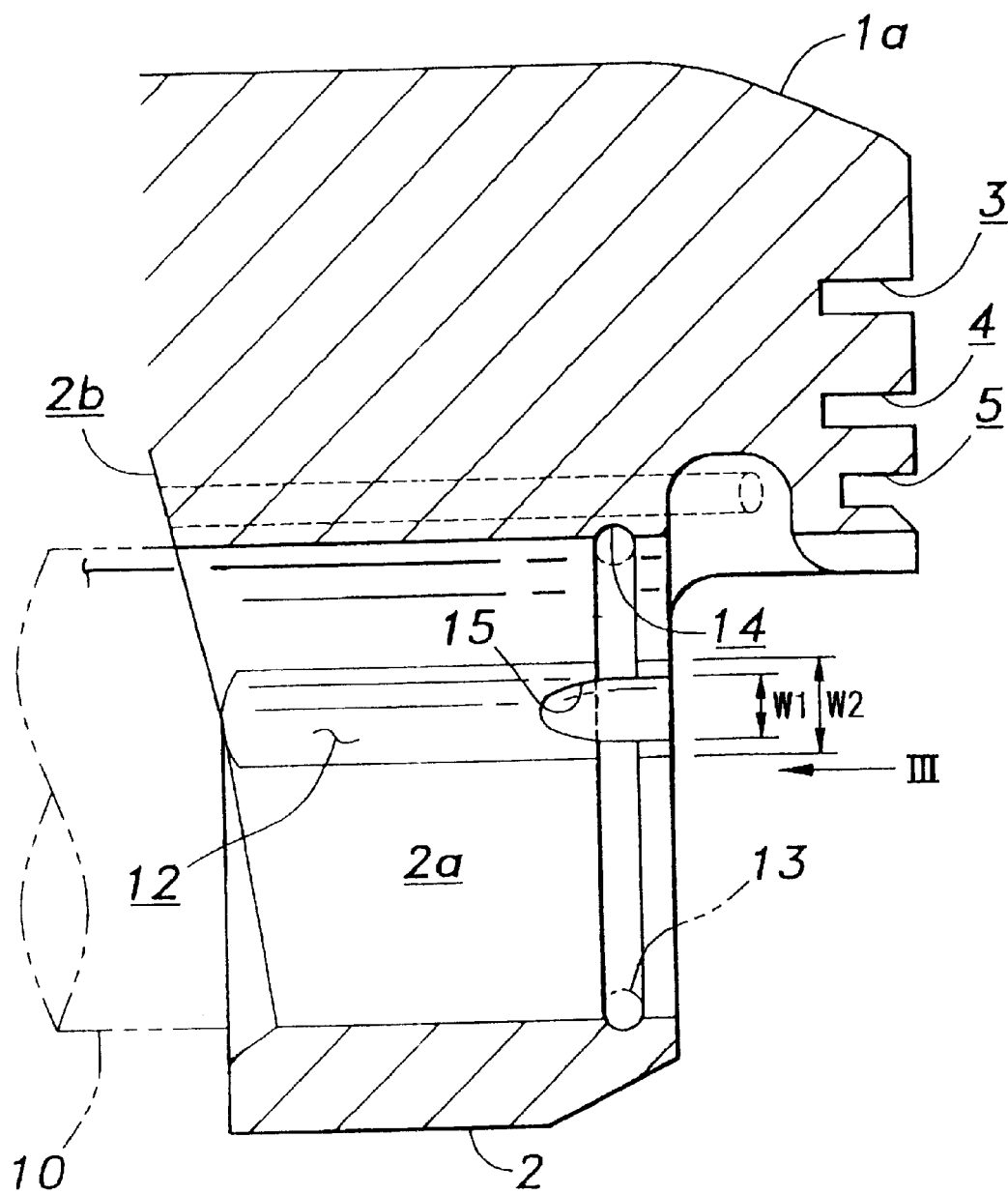
FIG. 2 is an enlarged sectional view of a main part taken along a line designated by arrows II, II of FIG. 1.

FIG. 1 is a front view of a piston 1 used in an engine to which the invention is applied, and FIG. 2 is an enlarged sectional view of a main part taken along a line designated by arrows II, II in FIG. 1. The piston 1 includes a piston head 1a and a pair of piston pin supporting portions 2 (only one of the pair is shown in FIG. 2) provided in such a manner as to protrude from a back of the piston head 1a which is opposite to a combustion chamber side thereof.

Three ring grooves 3, 4, 5 are formed in an outer circumferential surface of the piston head 1a in an axial direction of the piston at predetermined intervals. Compression rings (not shown) are mounted in the two ring grooves 3, 4 on the combustion chamber side (upper in the figure) and an oil ring (not shown) is mounted in the ring groove 5 formed as an oil ring groove on the oil pan side (lower in the figure).

As shown in FIG. 2, a pin bore 2a is formed in the piston pin supporting portion 2 which has an inside diameter which allows a piston pin 10 to be inserted therethrough, and the piston pin 10 is supported by the two piston pin supporting portions 2 at ends thereof. A small-end of a connecting rod 11 is securely press fitted in an intermediate portion exposed between the two piston pin supporting portions 2.

Figure 3:
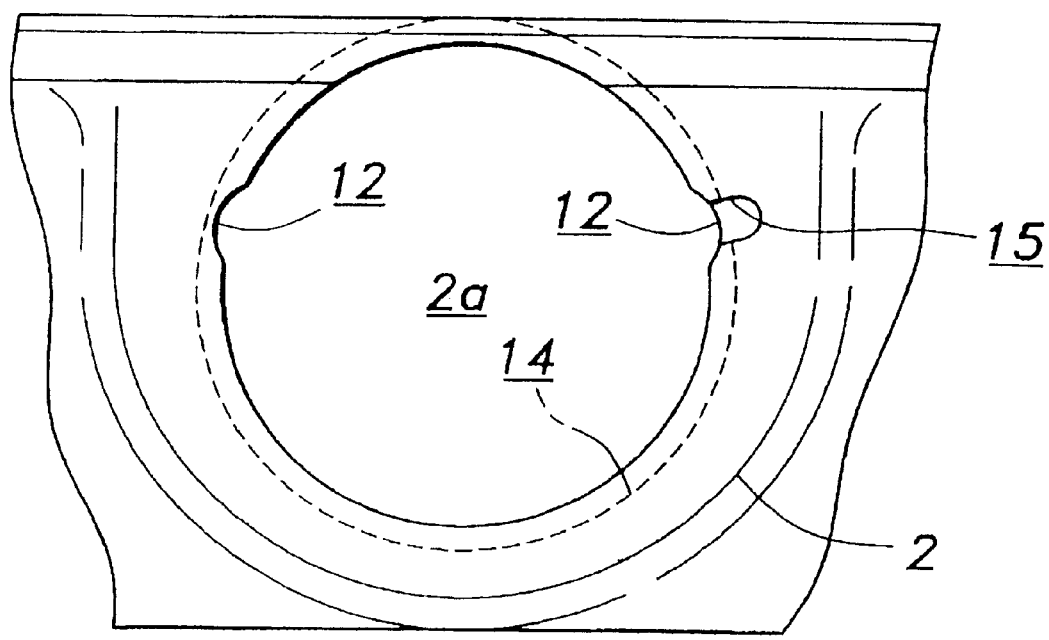
FIG. 3 is an enlarged end view of a pin bore seen from a direction designated by an arrow III in FIG. 2.

Broached grooves 12, which each are an axial groove, are formed in the pin bore 2a along the axial direction thereof at transversely symmetrical positions as viewed in the axial direction, this clearly being illustrated in FIG. 3. The broached grooves 12 are intended as a stress reduction means for relieving the compression deformation of the piston pin 10 that would be caused by a thrust load produced during a combustion and explosion stroke, and they are also used as a lubricating oil supply means for leading the lubricating oil into the piston bore. These broached grooves 12 are formed relatively shallow relative to the inner circumferential surface of the pin bore 2a. In addition, a clip groove 14 comprising a circumferential groove is formed in the inner circumferential surface of the pin bore 2a on a side thereof facing the outer circumferential surface of the piston so that a circlip 13 which is an annular clip for preventing the removal of the piston pin 10 inserted through the pin bore 2a can be securely fitted therein in a springing fashion.

Then, in a case where the piston pin 10 is removed in serving a vehicle for maintenance, the circlip 13 is deformed in a radially inward direction with a relevant tool so that it is released from the fitment into the clip groove 14 for removal therefrom. According to the invention, a recessed portion 15 acting as a hole for the relevant tool to be inserted thereinto for the removal of the circlip 13 is formed in the inner circumferential surface of the pin bore 2a at an outer end thereof in such a manner as to coincide in location with the broached groove 12. In other words, the recessed portion 15 formed in the inner circumferential surface of the pin bore 2a coincides in location with the broached groove (axial groove) 12 formed in the inner circumferential surface of the pin bore 2a (for the piston pin 10) so as to function not only as the stress reducing means but also as the lubricating oil supply means.

According to the above construction, since the recessed groove 15 is not formed at a different position from where the axial groove 12 is formed, the number of recessed portions (grooves) to be formed in the pin bore 2a can be limited to a minimum required number, whereby the deterioration in rigidity that would be caused by the provision of the recessed portion can be prevented. In addition, as described above, since the broached grooves 12 for relieving the compression deformation of the piston pin 10 are originally formed in a portion of the piston pin supporting portion 2 which has a higher rigidity, even if the recessed portion 15 is formed relatively deep so that the relevant tool can be inserted thereinto, the effect on the deterioration in rigidity thereat of the formation of the recessed portion 15 can be ignored. Therefore, the deterioration in rigidity at the piston pin supporting portion due to the formation of the recessed portion 15 can be prevented further and there is no risk of the lubricating oil being shut off by the circlip 13 by aligning the recessed portion 15 formed relatively deep with the broached groove 12, whereby a large quantity of lubricating oil can be led into the pin bore 2a, thereby making it possible to improve the lubrication thereof.

Furthermore, in the illustrated embodiment of the invention, the circumferential width W1 of the recessed portion 15 is made smaller than the circumferential width W2 of the broached groove 12. According to this construction, even if there are produced burrs along the edge of the recessed portion 15 when the recessed portion is cut to be formed, since the recessed portion 15 is accommodated in the broached groove 12, the burrs so produced are prevented from protruding radially inwardly from the inner circumferential surface of the pin bore 2a, and this obviates the necessity of additional work including deburring. In other words, since the burrs are prevented from protruding from the inside of the broached groove 12 to the sliding surface of the piston pin 10, there is no need to carry out additional work such as deburring. Moreover, when the broached groove 12 is formed after the recessed portion 15 has been formed, the aforesaid deburring work can be avoided.

Moreover, the location of the axial groove (broached groove 12) according to the invention is not limited to the position illustrated in the embodiment, and it may be provided at any position with respect to the circumferential direction of the pin bore 2a. For instnce, it may be provided at a lower end portion of the pin bore 2a (on a crankshaft side thereof) In any case, there is no limitation to the location of the axial groove as long as the recessed portion 15 can coincide in location with the axial groove (broached groove 12).

In addition, although this embodiment discloses that the depth of the circumferntial groove (clip groove 14) is formed deeper than the depth of the axial groove (broached groove 12), on the contrary, the depth of the axial groove may be formed deeper than the circumferential groove. In this case, the axial groove may also function as the recessed portion 15 for inserting the tool.

Figure 4:
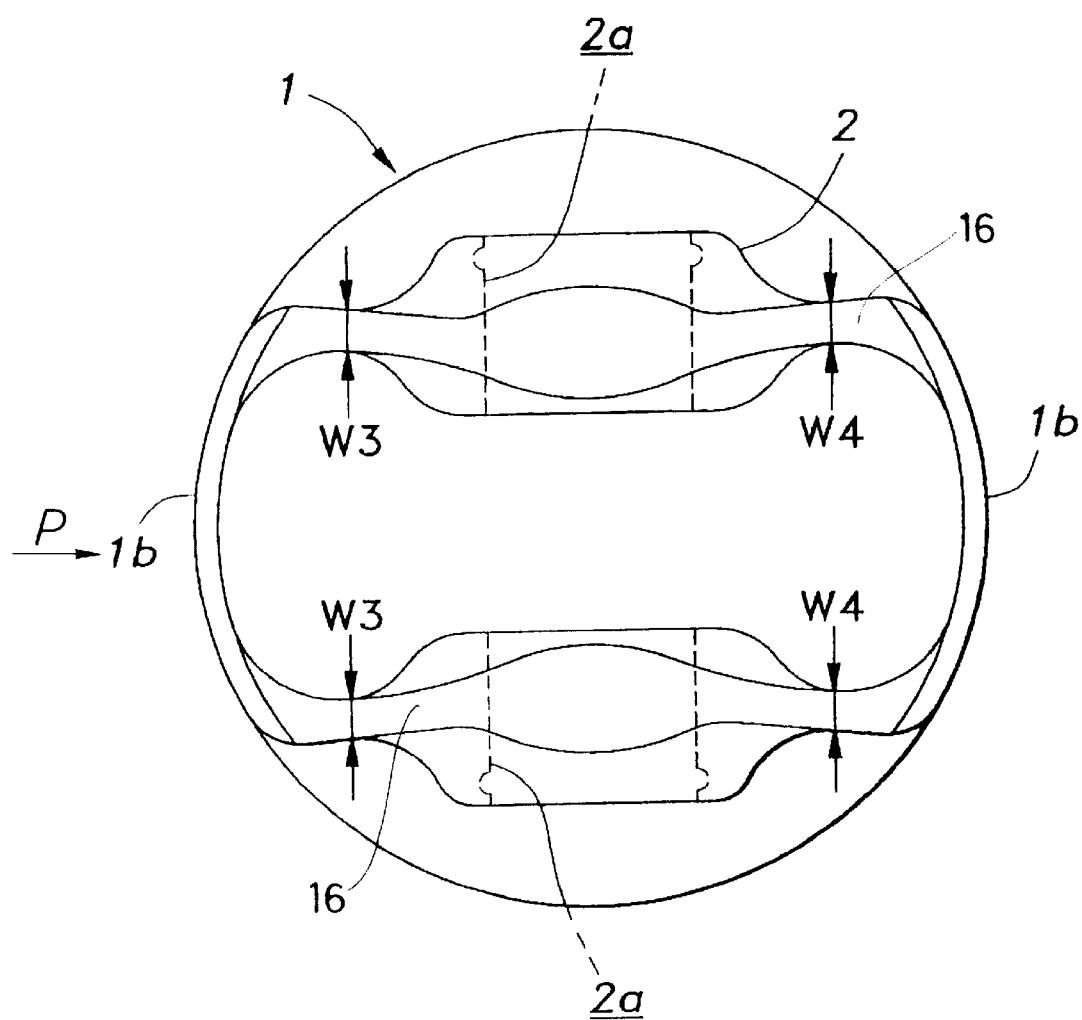
FIG. 4 is a back side view of the piston seen from a direction designated by an arrow IV in FIG. 1.

In the piston 1 of the invention, as much excess metal as possible is tried to be cut away on the back of the piston head 1a in order to reduce the weight thereof, but as shown in FIG. 4 showing the back of the piston head, a pair of connecting walls 16 passing through the pair of piston pin supporting portions 2, respectively, are formed between skirt portions 1b forming outer circumferential walls shown on left and right sides of the figure, so as to secure the required rigidity. In addition, since a great magnitude of thrust load is applied to the piston 1 from a direction indicated by an arrow P during a combustion and explosion stroke, the thickness W3 of the connecting wall 16 on a side thereof receiving the thrust load P is made thicker than the thickness W4 of the wall on a side opposite to the thrust load receiving side (opposite side to the thrust side). This helps improve the rigidity of the piston 1 with a minimum required increase in the thickness of the connecting walls 16.

In addition, the recessed portion 15 is formed on the opposite side to the thrust side of the skirt portion 1b. That is, since the recessed portion 15 is formed on the opposite side to the thrust side where a great magnitude of thrust load is applied, the deterioration in rigidity at the piston bore 2a can be suppressed.

Thus, according to the invention, since not only can the deterioration in rigidity that would be caused by the formation of the recessed portion be prevented but also the lubricating oil can be led into the axial groove via the recessed portion, the lubrication inside the pin bore can be improved preferably. In addition, even if burrs are produced at the edge of the recessed portion when the recessed portion is cut to be formed, the burrs so produced can be prevented from protruding further inwardly from the inner circumferential surface of the pin bore by allowing the recessed portion to be accommodated in the broached groove, this obviating the necessity of carrying out additional work including deburring. Furthermore, the deterioration in rigidity that would be caused by the formation of the recessed portion can further be prevented by forming the axial grooves acting as the stress reducing means in the portion having a higher rigidity and aligning the recessed portion with the axial groove so formed.

What is claimed is:

1. A piston, comprising:
a piston head; and
a piston pin supporting portion defining a pin bore for inserting a piston pin, an inner circumferential surface of said pin bore being formed with an axial groove, a circumferential groove for assembling therein an annular clip for preventing the removal of the piston pin inserted through said piston bore and a recessed portion provided at an outer end thereof so that the annular clip is removable by deforming the annular clip in a radially inward direction,
wherein said recessed portion coincides in location of the radial direction of said pin bore with said axial groove.

2. A piston as set forth in claim 1, wherein the circumferential width of said recessed portion is smaller than that of said axial groove.

3. A piston as set forth in claim 1, wherein the depth of said circumferential groove in the radial direction of said pin bore is deeper than that of said axial groove.

4. A piston as set forth in claim 3, wherein the depth of said recessed portion in the radial direction of said pin bore is deeper than that of said axial groove.

5. A piston as set forth in claim 2, wherein said axial groove is formed after said recessed portion is formed.

6. A piston as set forth in claim 1, wherein said axial groove comprises a plurality of axial grooves formed in the inner circumferential surface of said pin bore, while said recessed portion is formed at only one of said plurality of axial grooves.

7. A piston as set forth in claim 1, wherein said recessed portion is formed on an opposite side to a thrust side to which a thrust load is applied.

8. A piston as set forth in claim 6, wherein said recessed portion is formed on an opposite side to a thrust side to which a thrust load is applied.

9. A piston as set forth in claim 1, wherein a connecting wall connecting between said piston pin supporting portion and a skirt portion of said piston is formed in such a manner that the thickness of a thrust side to which a thrust load is applied is larger than that of an opposite side to said thrust side.

10. A piston comprising:

a piston head; and a piston pin supporting portion defining a pin bore for inserting a piston pin, an inner circumferential surface of said pin bore being formed with an axial groove, a circumferential groove for assembling therein an annular clip for preventing the removal of the piston pin inserted through said piston bore and a recessed portion provided at an outer end thereof so that the annular clip is removable by deforming the annular clip in a radially inward direction, wherein said recessed portion coincides in location of the radial direction of said pin bore with said axial groove, the circumferential width of said recessed portion is smaller than that of said axial groove, the depth of said circumferential groove is deeper than that of said axial groove, and the depth of said recessed portion is deeper than that of said axial groove.

11. A piston as set forth in claim 10, wherein said axial groove comprises a plurality of said axial grooves formed in the inner circumferential surface of said pin bore, while said recessed portion is formed at only one of said plurality of said axial grooves.

12. A piston as set forth in claim 11, wherein said recessed portion is formed on an opposite side to a side to which a thrust load is applied.

13. A piston as set forth in claim 12, wherein a connecting wall connecting between said piston pin supporting portion and a skirt portion of said piston is formed in such a manner that the thickness of the thrust side is larger than that of the opposite side to said thrust side.

14. A piston comprising:

a piston head; and a piston pin supporting portion defining a pin bore for inserting a piston pin, an inner circumferential surface of said pin bore being formed with a circumferential groove for assembling therein an annular clip for preventing the removal of the piston pin inserted through said piston bore, a pair of axial grooves provided in a thrust side of said piston to which a thrust load is applied and an opposite side to said thrust side, respectively and a recessed portion provided at an outer end thereof in the opposite side of said thrust side so that the annular clip is removable by deforming the annular clip in a radially inward direction, wherein said recessed portion coincides in location of the radial direction of said pin bore with said axial groove.

15. A piston as set forth in claim 1, wherein the depth of said axial groove in the radial direction of said pin bore is deeper than that of said circumferential groove.

16. A piston as set forth in claim 1, wherein said circumferential groove is located at a position apart from the outer end of said pin bore by a predetermined distance in a longitudinal direction of the pin bore, and the length of said recessed portion is set to be longer than the predetermined distance.

* * * * *